United States Patent [19]

Bard

[11] Patent Number: 4,790,110

[45] Date of Patent: Dec. 13, 1988

[54] TILE-LIKE CERAMIC ELEMENT HAVING AN ELECTRICALLY CONDUCTIVE SURFACE GLAZE ON THE VISIBLE SIDE

[75] Inventor: Martin Bard, Amberg, Fed. Rep. of Germany

[73] Assignee: Buchtal Gesellschaft mit beschrankter Haftung, Fed. Rep. of Germany

[21] Appl. No.: 56,062

[22] Filed: Jun. 1, 1987

[51] Int. Cl.⁴ ............................................... E04I 13/08
[52] U.S. Cl. ..................... 52/173 R; 52/389; 52/612
[58] Field of Search ............ 52/173, 126.6, 389, 52/612; 428/49

[56] References Cited

U.S. PATENT DOCUMENTS

| | | | |
|---|---|---|---|
| 2,734,007 | 2/1956 | Toulmin | 52/173 |
| 2,949,387 | 8/1960 | Colbert | 52/173 |
| 3,811,237 | 5/1974 | Bettinger | 52/126.6 |
| 3,845,353 | 10/1974 | Shirai | 428/67 |
| 3,941,918 | 3/1976 | Nigol | 174/140 C |
| 3,962,142 | 6/1976 | Freeman | 174/35 MS |
| 4,456,944 | 6/1984 | Rooklyn | 428/83 |
| 4,606,156 | 8/1986 | Sweers | 52/263 |
| 4,621,468 | 11/1986 | Likozar | 52/263 |

FOREIGN PATENT DOCUMENTS 211284  2/1987  European Pat. Off. ............. 52/173

Primary Examiner—Henry E. Raduazo
Attorney, Agent, or Firm—Reese Taylor

[57] ABSTRACT

For a tile-like ceramic element provided on its visible side with an electrically conductive surface glaze which, when the tile-like ceramic element is laid with a plurality of such elements to form a covering for lining walls or floors, communicates conductively with a substructure which diverts electricity and is to be provided below the covering, its laying to form a flooring can be performed utterly independently, so that a joint material can be selected which completely meets all requirements to be met by such a material in terms of its scuff resistance, its elasticity and hygienic properties, and allows for at least part of the side of the tile-like ceramic element facing away from the visible side to be coated with a material having good electrically conductive properties which communicates with the surface glaze in electrically conductive fashion.

6 Claims, 1 Drawing Sheet

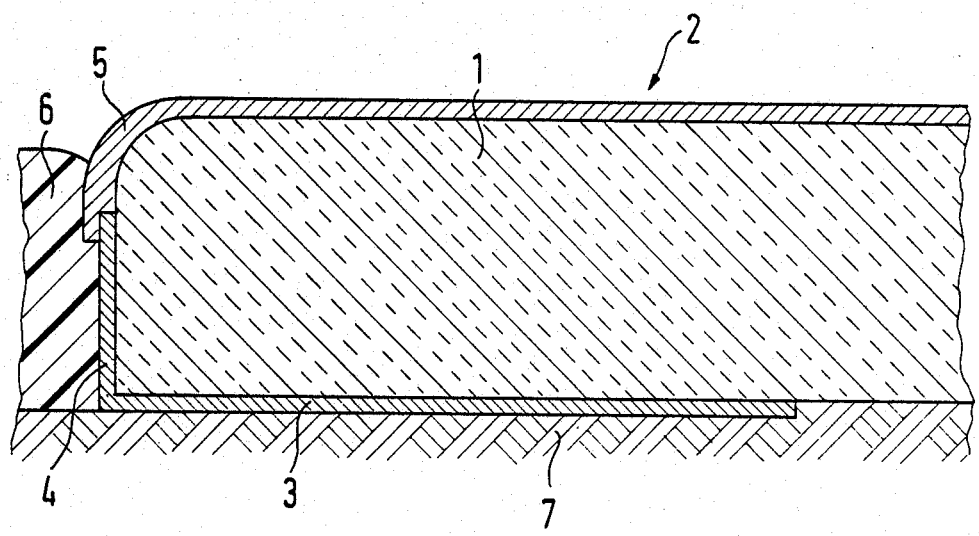

TILE-LIKE CERAMIC ELEMENT HAVING AN ELECTRICALLY CONDUCTIVE SURFACE GLAZE ON THE VISIBLE SIDE

RELATED PATENT APPLICATIONS

This application is related to Ser. No. 887,116, filed July 18, 1986, and now abandoned.

BACKGROUND OF THE INVENTION

The present invention relates to a tile-like ceramic element which is provided on its visible side with an electrically conductive surface glaze which, when the tile-like ceramic element is laid together with a plurality of such elements to form a covering for lining walls or floors, communicates with an electrically diverting substructure to be provided below the covering. Coverings made of such tiles are used, for example, as flooring for operating rooms, laboratories, industrial rooms with a fire risk such as paint shops, paint factories, storehouses for inflammable solvents, etc. They have also started to be used in areas where a noticeable discharge on persons is to be avoided, for example in office rooms in which computers and similar electrical and electronic devices are set up.

Flooring in operating rooms and the like is required to ensure constant diversion of static electricity and, at the same time, to prevent current from flowing off at a dangerous strength when there is contact between a human body and poorly insulated current-carrying parts. This generally means that the flooring must have an electrical resistance in the range of $10^4$ to $10^6$ ohms.

The flooring made of PVC and other synthetic materials as used up to now suffers from the fact that its resistance to organic solvents and other chemicals leaves much to be desired. Furthermore, such flooring must be connected to the floor by electrically conductive adhesives which are not stable for long periods in terms of their conductivity.

Use has, therefore, begun to be made of ceramic floor tiles produced by firing molded mixtures of stoneware clay or potter's clay and iron oxide in an atmosphere customary for firing floor tiles. German "auslegeschrift" No. 17 71 361 might be stated as an example of a method of producing such electrically semiconductive ceramic floor tiles. However, the admixture of iron oxides to the ceramic material causes darkly colored unglazed ceramic surfaces to be obtained. Furthermore the band width of the conductivity of such floor tiles made to be electrically conductive is insufficient.

In "Baukeramik" 8/84, p. 96, the Villeroy & Boch Company presents a new grayish-blue conductive tile with a 15×15 cm format, consisting, in the practical, commercially available embodiment, of a ceramic tile having an electrically conductive coating drawn over the side edges. Thus, electricity can be diverted only via the joint material adjacent to the edges of such tiles, which generally consists of material bound with cement made to be electrically conductive. However, this joint material is subject to aftercontraction so that the electrical contact with the side edges of the tiles can disappear at least in part. Furthermore, this joint material is washed out very quickly in view of the cleaning which must be performed extremely often, in particular in operating rooms, which also leads to a reduction of the contact surfaces. Thus, not only does the leakage resistance vary, the mechanical loading capacity of the tile covering also suffers. Furthermore, when the joint material contracts or is worn away, this gives rise to tiny spaces that may fill with germs between the tile edges and the joint material, which is absolutely intolerable in operating rooms. As the cited publication shows, the tiles have a relatively small format so that the on-side transition resistance required by the test standard (VDE Regulation 0100/5.73 Art. 24) can only be reached by the joint portion.

SUMMARY OF THE INVENTION

The invention is based on the problem of making the laying of such a flooring utterly independent of the joint material so that a joint material can be selected which completely meets all requirements to be met by such a material in terms of its scuff resistance, its elasticity and hygienic properties.

This problem is solved by the invention by coating at least part of the side of the tile-like ceramic element facing away from the visible side with a material having good electrically conductive properties which communicates with the surface glaze in electrically conductive fashion.

A particular advantage of the inventive design of the tile-like ceramic element is that the joint material need no longer be considered as a diverting element at all. Thus, one can use any joint material on the basis of epoxy resins, which are especially well-suited for the particular application, for example in operating rooms or the like.

Since the joint material does not play any part when it comes to diverting electricity, the tile dimensions can be selected at will. Thus, one can select an optimum value for the relation between the tile area and the joint area in such wall or floor linings, i.e., reduce the proportional joint area to a minimum.

It is particularly advantageous to use tile-like elements having a tile thickness of approximately 8 mm and less and dimensions of 60×60 cm to 120×160 cm. Tile dimensions of 60×60 cm correspond essentially to the conventional grid dimensions, resulting in particularly easy laying and access possibilities for connections to be provided on the floor level.

It may be advantageous for the surface glaze to communicate in electrically conductive fashion with the coating on the side facing away from the visible side, for example by drawing the surface glaze somewhat over the side edge coating. This also creates the possibility of achieving a better appearance when the joint material in the joint is not flush with the surface of the covering.

It is expedient for the surface glaze to run at the edge directly into the edge coating. However, it is also possible to provide the edge coating only locally. The same applies to the transition between the edge coating and the coating on the side facing away from the visible side. The coating need not necessarily cover the entire surface here; it may suffice for the coating to cover part of the side facing away from the visible side.

If a coating material is selected whose melting point is substantially higher than the melting point of the surface glaze, the tile-like ceramic element can be made by a single firing because the coating on the side facing away from the visible side only sinters in the temperature range in which the surface glaze begins to flow, so that the tile-like ceramic element is prevented from clinging to or bonding with the means of transport. For if a material similar to the material of the surface glaze were used instead of this coating, this material would flow in the corresponding firing interval and the side of the tile-like ceramic element facing away from the visible side would adhere to the means of transport.

According to a modified embodiment of the invention, the coating is produced only after the firing of the tile-like element provided with the surface glaze by applying a conductive paste or a conductive varnish, which is then sintered or set by the effect of heat, or by vacuum metalizing or plasma spraying a conductive substance. A dipping process or other suitable coating process may also be used.

Since the electrical resistance of the coating is in any case substantially smaller than that of the surface glaze, only the electrical resistance of the surface glaze is responsible or the conductivity of the corresponding tile-like ceramic element, can thus be precisely adjusted and is also maintained for a long period of time.

The prior art also includes British Patent No. 1,202,924.

In the embodiment according to FIG. 2 of this patent, which is the only one of interest here, the floor consists of a layer of bituminous felt which is laid over a concrete base. The bituminous felt is bent upwards at the edges. One or more layers of polyethylene layer material coated with bitumen are laid over the bituminous felt and also bent up at the edges. Copper strips are then laid on this layer material and connected to ground via at least two resistors. The flooring itself consists of terrazzo tiles. These terrazzo tiles are special tiles which have been given the appropriate conductivity by the incorporation of a corresponding conductive additive into the mixture before the production of the tiles. This evidently does not address either the problem on which the invention is based on the solution thereto, for it is assumed in the case of the subject of the invention that the glaze is to be electrically conductive, the important thing being that this is independent of the joint material.

OF THE DRAWINGS

The single FIGURE shows a cross-section of the embodiment of a tile-like ceramic element according to the invention.

1 refers to a tile-like ceramic body having on its side facing away from visible side 2 a coating 3 extending at least partly across this side and running at the side edge into an edge coating 4 covered at least partly by surface glaze 5 which extends across the entire visible side 2 of ceramic body 1. At 6 one can see the joint material which consists, for example, of an epoxy resin and need not have any electrical conductivity whatsoever because electricity can flow off directly into a diverting element 7 via glaze 5, edge coating 4 and coating 3 present on the side facing away from the visible side.

Surface glaze 5 and coatings $\frac{3}{8}$ are made of materials having different conductivity. The conductivity of coating $\frac{3}{8}$ is higher than that of surface glaze 5. In the case of an electrically conductive ceramic coating, the melting point of the coating material is higher than that of the surface glaze material, so that when ceramic body 1 is fired, the coating material only sinters, but does not melt, so that it cannot stick to the firing base.

What is claimed is:

1. A tile-like ceramic element for attachment to a substructure having a visible side and a side facing away from the visible side, comprising: an electrically conductive surface glaze on the visible side which, when the tile-like ceramic element is laid with a plurality of such elements to form a covering for lining walls or floors, communicates conductively with the substructure which diverts electricity and is disposed under the covering, characterized in that at least part of the side of the tile-like ceramic element facing away from the visible side is coated with a material having good electrically conductive properties which communicates with the surface glaze in electrically conductive fashion via a coating on at least one side edge which corresponds to the coating on the side facing away from the visible side; with said coating on said side edge not extending onto said visible side.

2. The tile-like ceramic element according to claim 1, characterized in that the surface glaze runs at the edge directly into the edge coating.

3. The tile-like ceramic element according to claim 2, characterized in that the edge coating runs directly into the coating on the side facing away from the visible side.

4. The tile like ceramic element according to any of the preceding claims, characterized in that the coating on the side of the tile-like ceramic element facing away from the visible side is made of a material having good electrically conductive properties whose melting point is substantially higher than the melting point of the surface glaze.

5. The tile-like ceramic element according to any one of claims 1 to 3, characterized in that the coating is produced after the firing of the tile-like ceramic element provided with the surface glaze by applying a conductive paste or a conductive varnish or by vacuum metallizing or plasma spraying a conductive substance.

6. The tile-like ceramic element according to one of claims 1 to 3, characterized in that it has dimensions of 60×60 cm to 120×160 cm with a tile thickness of approximately 8 mm and less.

* * * * *

UNITED STATES PATENT AND TRADEMARK OFFICE
CERTIFICATE OF CORRECTION

PATENT NO. : 4,790,110
DATED : December 13, 1988
INVENTOR(S) : Bard

It is certified that error appears in the above-identified patent and that said Letters Patent is hereby corrected as shown below:

In Column 4, Line 3, delete "3/8" and substitute therefor --3/4--.

In Column 4, Line 5, delete "3/8" and substitute therefor --3/4--.

Signed and Sealed this

Eighth Day of August, 1989

Attest:

DONALD J. QUIGG

Attesting Officer

Commissioner of Patents and Trademarks